(12) United States Patent
Potier et al.

(10) Patent No.: US 11,327,005 B2
(45) Date of Patent: May 10, 2022

(54) TWIN-DISC TRIBOMETER

(71) Applicant: Goodrich Actuation Systems SAS, Saint-Ouen-l'Aumône (FR)

(72) Inventors: Karl Potier, Paris (FR); Arnaud De La Chevasnerie, Ville d'Avray (FR)

(73) Assignee: GOODRICH ACTUATION SYSTEMS SAS, Saint-Ouen l'Aumône (FR)

( * ) Notice: Subject to any disclaimer, the term of this patent is extended or adjusted under 35 U.S.C. 154(b) by 91 days.

(21) Appl. No.: 16/564,079

(22) Filed: Sep. 9, 2019

(65) Prior Publication Data
US 2020/0150026 A1    May 14, 2020

(30) Foreign Application Priority Data

Nov. 8, 2018   (EP) .................................... 18306464

(51) Int. Cl.
*G01N 19/02*    (2006.01)
(52) U.S. Cl.
CPC ..... *G01N 19/02* (2013.01); *G01N 2203/0032* (2013.01)
(58) Field of Classification Search
CPC ...... G01N 11/14; G01N 11/16; G01N 11/162; G01N 11/10; G01N 11/165
See application file for complete search history.

(56) References Cited

U.S. PATENT DOCUMENTS

| | | | | | |
|---|---|---|---|---|---|
| 3,886,789 | A | * | 6/1975 | Brookfield | ............. G01N 11/14 73/54.35 |
| 4,914,958 | A | * | 4/1990 | van Damme | ....... G01M 13/021 73/7 |
| 5,679,883 | A | * | 10/1997 | Wedeven | ................. G01N 3/56 73/10 |

(Continued)

FOREIGN PATENT DOCUMENTS

| FR | 2685774 A1 * | 7/1993 | ............. G01N 19/02 |
|---|---|---|---|
| GB | 2186700 A | 8/1987 | |

(Continued)

OTHER PUBLICATIONS

Ellen Bergseth et al., "Study of Surface Roughness on Friction in Rolling/Sliding Contacts: Ball-on-Disc Versus Twin-Disc", Tribology Letters, May 28, 2020. (Year: 2020).*

(Continued)

*Primary Examiner* — David A. Rogers
(74) *Attorney, Agent, or Firm* — Cantor Colburn LLP

(57) ABSTRACT

A twin-disc tribometer assembly includes a first sample drive shaft arranged to receive a first sample disc and a second sample drive shaft arranged to receive a second sample disc; a first drive motor configured to rotate the first drive shaft and a second motor arranged to rotate the second drive shaft. The first and second drive shafts are configured to be positioned relative to each other such that a sample disc mounted on the first drive shaft will make a point contact with a sample disc on the second drive shaft as the drive shafts rotate. The assembly is configured to allow the shafts (Continued)

to rotate relative to each other in a non-continuous reciprocating motion or a non-collinear motion where one sample disc is tilted with respect to the other.

4 Claims, 2 Drawing Sheets

(56) References Cited

U.S. PATENT DOCUMENTS

| | | | | |
|---|---|---|---|---|
| 6,094,967 | A * | 8/2000 | Cavdar | G01N 19/02 73/9 |
| 6,167,745 | B1 * | 1/2001 | Hamer | G01N 19/02 73/9 |
| 6,401,058 | B1 * | 6/2002 | Akalin | G01M 13/005 702/34 |
| 6,484,567 | B1 * | 11/2002 | Hajduk | G01N 3/24 73/54.23 |
| 6,655,194 | B2 * | 12/2003 | Hajduk | G01N 3/24 73/54.37 |
| 6,776,048 | B2 | 8/2004 | Corrias et al. | |
| 6,783,272 | B2 * | 8/2004 | Richard | G01N 3/56 219/600 |
| 7,188,516 | B2 * | 3/2007 | Devlin | G01N 19/02 73/115.02 |
| 8,056,398 | B2 * | 11/2011 | Jakli | G01N 11/16 73/54.41 |
| 9,581,534 | B2 * | 2/2017 | Adams, Jr. | G01N 19/02 |
| 10,647,938 | B2 * | 5/2020 | Lahouij | B82Y 40/00 |
| 2003/0063652 | A1 * | 4/2003 | Richard | G01N 19/02 374/121 |
| 2011/0067151 | A1 * | 3/2011 | Ito | G01R 3/00 850/59 |
| 2011/0203355 | A1 * | 8/2011 | Lindner | G01N 11/142 73/73 |
| 2013/0098139 | A1 * | 4/2013 | Adams, Jr. | G01N 3/56 73/7 |
| 2014/0172098 | A1 * | 6/2014 | Myung | A61L 27/52 623/14.12 |
| 2015/0082860 | A1 * | 3/2015 | Beau | G01N 19/02 73/9 |
| 2017/0108387 | A1 * | 4/2017 | Vinogradov-Nurenberg | G01L 1/26 |
| 2017/0326704 | A1 * | 11/2017 | Gran | B24B 5/40 |
| 2018/0127676 | A1 * | 5/2018 | Lahouij | C10M 125/10 |
| 2020/0080686 | A1 * | 3/2020 | Heau | F16N 1/00 |

FOREIGN PATENT DOCUMENTS

| | | | |
|---|---|---|---|
| SU | 1651165 A1 * | 5/1991 | |
| WO | 2108274 A | 5/1983 | |
| WO | 0127609 A2 | 4/2001 | |
| WO | 0127609 A3 | 4/2001 | |
| WO | WO-2006063597 A1 * | 6/2006 | |
| WO | WO-2019069322 A1 * | 4/2019 | G01N 3/56 |

OTHER PUBLICATIONS

Guido Boidi et al., "Effect of laser surface texturing on friction behaviour in elastohydrodynamically lubricated point contacts under different sliding rolling conditions", Tribology International, Feb. 15, 2019. (Year: 2019).*

K. Hiratsuka et al., "The twin-ring tribometer—Characterizing sliding wear of metals excluding the effect of contact configurations", Wear, Apr. 1, 2011. (Year: 2011).*

Yuta Kanazawa, "Film formation and friction in grease lubricated rolling-sliding non-conformal contacts", Tribology International, Jan. 21, 2017. (Year: 2017).*

J.D. Leao et al., "New formulations of sunflower based bio-lubricants with high oleic acid content—VOSOLUB project", 2016. (Year: 2016).*

C. A. Manier et al., "Benchmark of thin film coatings for lubricated slip-rolling contacts", Wear, Feb. 21, 2010. (Year: 2010).*

Marzieh Salehi et al., "Measuring rubber friction using a Laboratory Abrasion Tester (LAT100) to predict car tire dry ABS braking", Tribology International, Oct. 15, 2018. (Year: 2018).*

H.M.A. Smetsers, "Applying a CVT in a two roller test machine", Aug. 25, 2006. (Year: 2006).*

Mesfin G. Tsadik et al., "Extent Of Adhesion Losses In The Wheel-Rail Contact Under Contaminated Conditions", Journal of EEA, vol. 34, Jun. 2016. (Year: 2016).*

Yi Zhu et al., "Twin-disc tests of iron oxides in dry and wet wheel-rail contacts", Journal of Rail and Rapid Transit, vol. 230, No. 4, 2015. (Year: 2015).*

Yi Zhu et al., "Investigation of factors influencing wheel-rail adhesion using a mini-traction machine", Wear, Jun. 13, 2012. (Year: 2012).*

MTM2—Mini-Traction Machine, PCS Instruments, available online at <<https://pcs-instruments.com/wp-content/uploads/2017/01/MTM2-brochure-2017-Publisher-version-1.pdf>>, Jan. 2017. (Year: 2017).*

Hani Haider et al., "Simultaneous measurement of friction and wear in hip simulators", Journal of Engineering in Medicine, vol. 230, No. 5, May 2016. (Year: 2016).*

Graham Isaac et al., "Thermal analysis of twin-disc machine for traction tests and scuffing experiments", Journal of Engineering in Medicine, vol. 232, No. 12, Feb. 15, 2018. (Year: 2018).*

Extended European Search Report for International Application No. 18306464.1 dated Jun. 13, 2019, 19 pages.

European Official Letter for Application No. 18306464.1, dated Nov. 18, 2021 (16 pages).

Savolainen, et al. "An experimental investigation of scuffing initiation due to axial displacement in a rolling/sliding contact" Tribology International, vol. 119 (2018) 688-697 (Dec. 6, 2017).

* cited by examiner

TWIN-DISC TRIBOMETER

FOREIGN PRIORITY

This application claims priority to European Patent Application No. 18306464.1 filed Nov. 8, 2018, the entire contents of which is incorporated herein by reference.

TECHNICAL FIELD

The present disclosure relates to the field of testing equipment and in particular to a test disc configuration for a twin-disc tribometer.

BACKGROUND

In various fields of engineering, it is important to understand the properties and behaviour of materials used for making parts and components, in particular to understand how such materials might react or degrade in response to the forces and kinematics that might act on them in use. Having this information enables the components to be made safely and to be reliable, and there is better knowledge as to when and how such components might wear, degrade or fail and require replacement or repair. In aircraft components, for example, knowledge of the degradation properties of components subject to the forces arising during aircraft operation enables engineers to know when such components will need to be replaced before damage occurs that can have catastrophic consequences. It also avoids the need for redundancy in such components, which adds to the weight, size and cost of the aircraft.

Many components in the field of contacts mechanics have complex design and many internal contacts. Tribometry is conventionally used to understand the degradation phenomena of the internal contacts of a component by subjecting samples of materials used for the contacts to tests. Tribometry, performed in a tribometer, involves mounting test samples of the materials to be tested into the tribometer to be driven by a motor to subject them to impact, forces and friction as would happen in real use of the contact. Usually samples of the two contacting materials are mounted on motor drive shafts in contact with each other. The wear or degradation of the samples after the test, identified by weighing, measuring, visual examination etc., provides an indication of how the contacts will degrade in use.

The wide variety of components that need to be tested will, in use, be subject to a range of forces and exhibit a range of kinematics. For full testing, therefore, a wide range of tribometers has been developed to replicate the different relative motions that can occur between contacts. The samples may be tested in different (and possibly several different) tribometers depending on their intended use. Tribometers are available to test samples subject to pure relative rolling motion, pure relative sliding motion, continuous motion or reciprocal motion.

A twin-disc tribometer has been developed to provide a number of test configuration capabilities. An example of a twin-disc test bench tribometer 1 is shown in FIG. 1A. The tribometer uses two different samples in the form of discs 2, 3. Both samples (see FIG. 1B) touch each other radially at a point contact under a monitored load. Each sample 2,3 is driven by a different motor 4,5 via respective rotating shafts 6,7. The samples can be rotated to replicate pure rolling motion, pure sliding motion or rolling with sliding motion. There are, however, limitations to twin-disc tribometers. For example, they only reproduce continuous motion and the sliding speed is always collinear with the rolling speed.

In real-life use, contact components exhibit a much wider range of kinematics and the aim of the present disclosure is to provide a tribometer arrangement capable of reproducing these kinematics in a reliable, automated, reproducible and relatively simple manner.

SUMMARY

The present disclosure provides a twin-disc tribometer assembly comprising a first sample drive shaft arranged to receive a first sample disc and a second sample drive shaft arranged to receive a second sample disc; a first drive motor configured to rotate the first drive shaft and a second motor arranged to rotate the second drive shaft; the first and second drive shafts configured to be positioned relative to each other such that a sample disc mounted on the first drive shaft will make a point contact with a sample disc on the second drive shaft as the drive shafts rotate; and wherein the assembly is configured to allow the shafts to rotate relative to each other in a non-continuous or non-collinear motion.

In a first aspect, a motor control is provided to provide a first motor drive operation where the first and second motors rotate the first and second shafts to rotate in a continuous rotational motion and to provide a second motor drive operation where the first and second motors drive the first and second shafts in a reciprocating motion relative to each other—i.e. first in one direction of rotation and then in the opposition direction.

For the oscillating motion, the motor control operates the motors using a position control loop set to perform a sinusoid of fixed magnitude and frequency. The sinusoidal frequency will be the same for the two motors, but the magnitudes will be different. This will lead to a ratio between sliding speed and rolling speed known as a sliding ratio, that does not vary with time over the sinusoids. This allows similar sliding conditions to exist between continuous motion and reciprocation motion for appropriate comparison.

In a second aspect, the non-collinear motion can be provided by one or both of the drive shafts being configured to carry the samples such that one sample is tilted with respect to the other—i.e. so that the sample discs do not rotate around parallel axes.

The first and second aspects can be provided independently of each other or in combination.

Also provided is a method of operating a tribometer such that two sample discs are driven in a first motion mode whereby the discs rotate continuous and collinearly with respect to each other and in a second motion mode whereby the two sample discs rotate in a reciprocal motion relative to each other and/or about non-parallel axes with respect to each other.

Preferred embodiments will now be described with respect to the drawings.

DETAILED DESCRIPTION

Figure 1A:
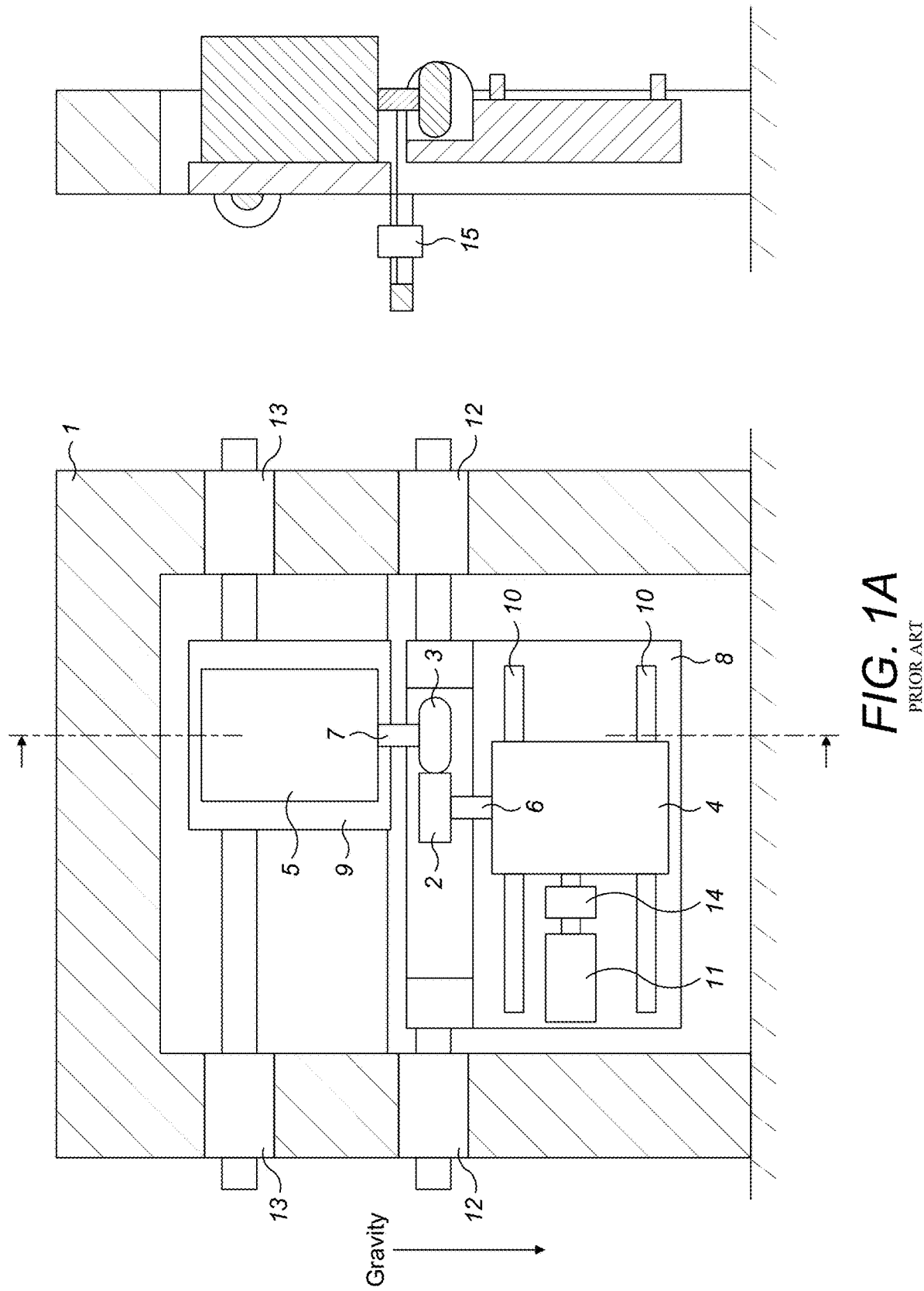
FIG. 1A is a perspective view of a twin disc test bench tribometer from the front and side.

FIG. 1A shows a standard twin disc tribometer 1 as used conventionally but which can also be adapted to operate according to the disclosure. The detail of FIG. 1A shows how the two sample discs 2,3 are mounted, respectively, on first and second drive shafts 6,7 driven respectively by first and second motors 4,5. The motors are controlled to rotate the shafts such that the sample discs mounted on the shafts rotate relative to each other. As they rotate, the sample discs contact each other. After a test period, the effects of the contact between the rotating samples can be examined, e.g. by visually examination, by measuring or by weighing, to determine the degradation of the materials due to their relative motion and contact.

Each motor, drive shaft and sample is mounted on a rotary support part 8,9. One or both of these can be mounted on sliders 10 to allow for the samples to be appropriately positioned relative to each other. Bearings 12 are also provided to support the motor, drive shaft and sample assemblies. A normal contact load actuator 11, a normal contact load sensor 14 and a tangential contact load sensor 15-4 may also be provided.

In more detail, in the embodiment shown, one rotary support part 9 is provided with bearings 12 to enable the tangential load contact sensor to contact the load—i.e. detect friction between the samples.

The other support part 8, which in this embodiment is configured to tilt relative to the above-mentioned support part 9, has bearings 13 for tilting the test sample 2 relative to the support axis.

The normal load contact actuator 11 is provided to provide normal contact load between the samples. Normal contact load sensor 14 can monitor this load.

The test procedure may proceed as follows:

The test samples 2,3 are mounted onto the shafts, but without contacting each other. The motors are started and are preferably allowed to run for a short time to stabilise. Actuator 11 is then powered and operates to move the first motor 4, shaft 6 and sample 2 along sliders 10 to contact the other sample 3. The contact load is then gradually increased to a nominal value while the motors continue to run. The test is then carried out under these conditions. When the samples start to wear, the actuator 11 retracts to break contact between the samples, the motors are stopped and the samples are removed for analysis.

Figure 1B:
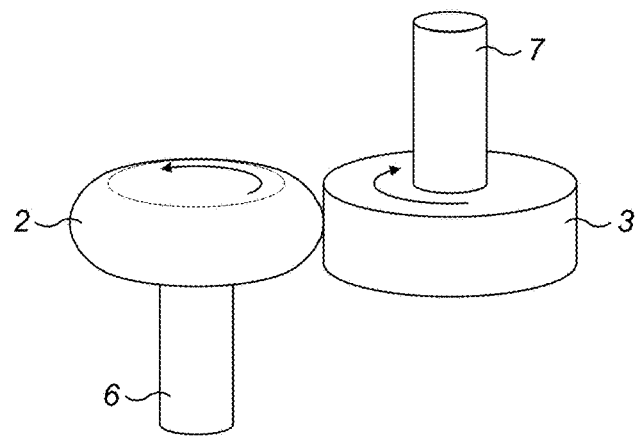
FIG. 1B shows two sample discs rotating relative to each other in the tribometer.

As discussed above, conventional tribometers only allow the motors to drive the shafts continuously as shown in FIG. 1B. If the sample discs should then be rotated in a different direction relative to each other, it would, conventionally, be necessary to mechanically change the direction of rotation of the shaft using mechanical components (not shown). The modification provided by this disclosure enables different component or contact kinematics to be reproduced in the test environment.

A motor controller (not shown) is configured to have two modes of operation: a continuous mode (as in the conventional systems) and also a reciprocating mode which can e.g. reproduce small oscillatory motions that many components undergo in use.

In the continuous mode, motor speeds are set to be constant to maintain a constant sliding ratio during motion. A slight speed difference can be set to produce a 'rolling with sliding motion'. This motion is shown in the left-hand image of FIG. 2. The continuous motion can be represented by the equations:

$$\theta_1(t) = \Omega_1 \cdot t$$

and $$\theta_2(t) = \Omega_2 \cdot t$$

where
$\theta_1$ is the angular position of the first test sample 2
$\theta_2$ is the angular position of the second test sample 3
$\Omega_1$ is the angular speed magnitude of the first test sample 2
$\Omega_2$ is the angular speed magnitude of the second test sample 3

Figure 2:
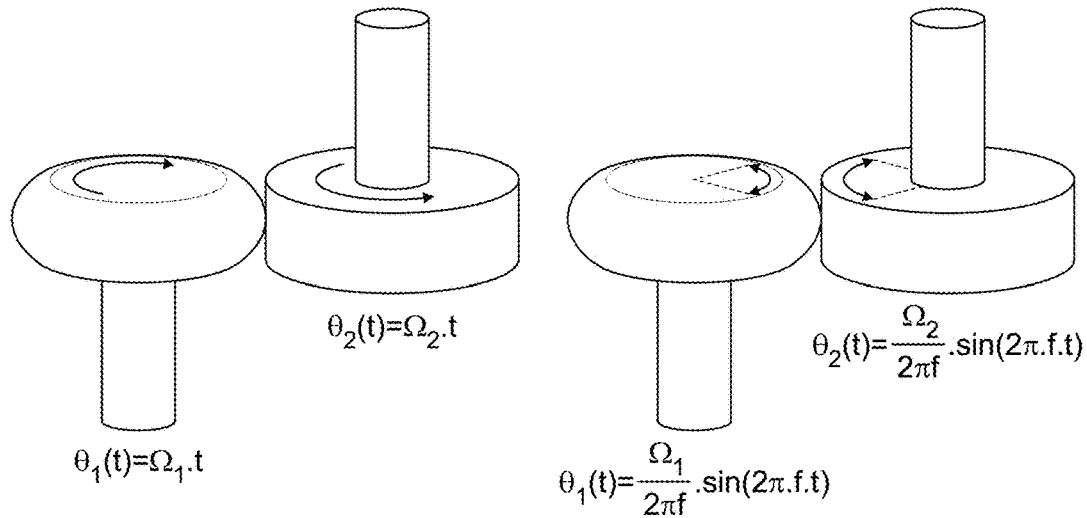
FIG. 2 shows the relative rotation of the sample discs according to a first aspect of the disclosure.

For the reciprocating mode, shown in the right-hand image of FIG. 2, the motor controller is configured (usually by means of software) to provide control commands to the motors to drive according to a sinusoidal drive control, i.e. to provide control commands to the motors with a position order that is a sinusoid of time, resulting in a reciprocating (to and fro) motion where the sinusoid frequency and magnitude can be set as control parameters in addition to the motor speed. If the sinusoidal frequency is constant for the two motors but the magnitude differs, the sliding ratio does not vary with time and can be adjusted or controlled. This reciprocating motion can be represented by the equations:

$$\theta_1(t) = \frac{\Omega_1}{2\pi f} \cdot \sin(2\pi \cdot f \cdot t)$$

and $$\theta_2(t) = \frac{\Omega_2}{2\pi f} \cdot \sin(2\pi \cdot f \cdot t)$$

where $f$ is the sinusoidal frequency.

FIG. 2 provides a simple view of how the sample discs will move relative to each other in the two different operating modes.

Figure 3:
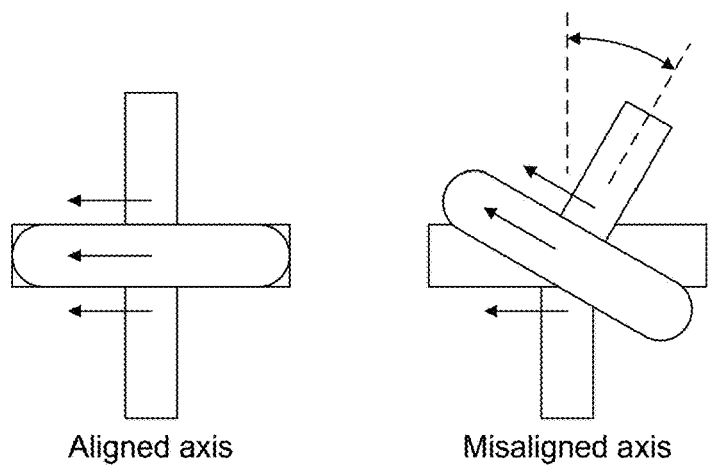
FIG. 3 shows the relative rotation of the sample discs according to a second aspect of the disclosure.

In a second aspect, instead of the two sample discs rotating about parallel shaft axes, one of the shafts 6,7 holding a sample disc 2,3 can be axially tilted relative to the other shaft, or one of the shafts can be configured to hold its sample disc in a tilted position relative to the axis in such a way that the axes of rotation of the two discs are not parallel (see FIG. 3). If the drive shafts are misaligned, the sliding speed is in a different direction to the rolling direction and this allows the magnitude and direction of sliding speed to be controlled.

With appropriate tilting and motor speed settings, the system can operate with any rolling speed and sliding speed direction and magnitude. Rolling and sliding speeds are independent of each other.

The two aspects can also be combined, such that the axes are tilted relative to each other and the motors are configured to operate with the two different (continuous and reciprocating) rotational modes.

Continuous motor speed can be set so that rolling speed is close to reciprocating speed magnitude, which is important for having similar lubricating conditions.

The assembly preferably lubricates the rotational components using e.g. oil or grease over a range of temperatures.

The assembly of this disclosure is thus capable of testing samples under different types of motion. The test bench provides a better representation of the possible effects on components in a wide range of uses. The capability to set a sliding speed in a direction different from the rolling speed is useful for testing contacts in components with complex kinematics. The assembly allows for a very large range of test sample diameters, heights and curvature radii (for toroidal samples). This is useful because it allows a wide range of load contact pressures and contact area dimensions, which can be important to be representative of some components. The control is provided from the motor controller usually as a software program and so no additional mechanical components are required to cause oscillatory motion.

The invention claimed is:

1. A twin-disc tribometer assembly comprising:
a first sample drive shaft arranged to receive a first sample disc;
a second sample drive shaft arranged to receive a second sample disc;
a first drive motor configured to rotate the first drive shaft; and
a second drive motor arranged to rotate the second drive shaft;
wherein the first and second drive shafts positioned relative to each other such that a sample disc mounted on the first drive shaft will make a point contact with a sample disc on the second drive shaft as the drive shafts rotate; and
wherein the shafts rotate relative to each other in a continuous rotational motion and in a non-continuous reciprocating motion,
wherein a motor control is provided to perform a first motor drive operation where the first and second motors drive the first and second shafts in a continuous rotational motion and to perform a second motor drive operation where the first and second motors drive the first and second shafts in a reciprocating motion relative to each other;
wherein the second motor drive operation uses a sinusoidal drive signal of fixed magnitude and frequency; and
wherein the sinusoidal frequency is the same for each of the first and second motors, but the magnitude is different.

2. A twin-disc tribometer as claimed in claim 1, wherein:
the shafts rotate the samples in a non-collinear motion where one sample disc is tilted with respect to the other; and
the non-collinear motion is provided by one or both of the drive shafts being configured to carry the samples such that one sample is tilted with respect to the other so that the sample discs do not rotate around parallel axes.

3. A twin-disc tribometer assembly comprising:
a first sample drive shaft arranged to receive a first sample disc;
a second sample drive shaft arranged to receive a second sample disc;
a first drive motor configured to rotate the first drive shaft; and
a second motor arranged to rotate the second drive shaft;
wherein the first and second drive shafts are positioned relative to each other such that a sample disc mounted on the first drive shaft will make a point contact with a sample disc on the second drive shaft as the drive shafts rotate;
wherein the assembly is configured to allow the shafts to rotate relative to each other in a continuous rotational motion and in a non-collinear motion where one sample disc is tilted with respect to the other, wherein non-collinear motion is provided by one or both of the drive shafts being configured to carry the samples such that one sample is tilted with respect to the other so that the sample discs do not rotate around parallel axes;
wherein the second motor drive operation uses a sinusoidal drive signal of fixed magnitude and frequency; and
wherein the sinusoidal frequency is the same for each of the first and second motors, but the magnitude is different.

4. A method of operating a tribometer, the method comprising:
driving two sample discs in a first motion mode whereby the discs rotate continuously and collinearly with respect to each other; and
selectively rotating the two sample discs in a second mode in a continuous rotational motion and in a reciprocal motion relative to each other and/or about non-parallel axes with respect to each other;
wherein the second motor drive operation uses a sinusoidal drive signal of fixed magnitude and frequency; and
wherein the sinusoidal frequency is the same for each of the first and second motors, but the magnitude is different.

* * * * *